May 26, 1936. M. ROSENBERG Re. 19,984
METHOD OF TREATING TOBACCO
Original Filed Sept. 26, 1934
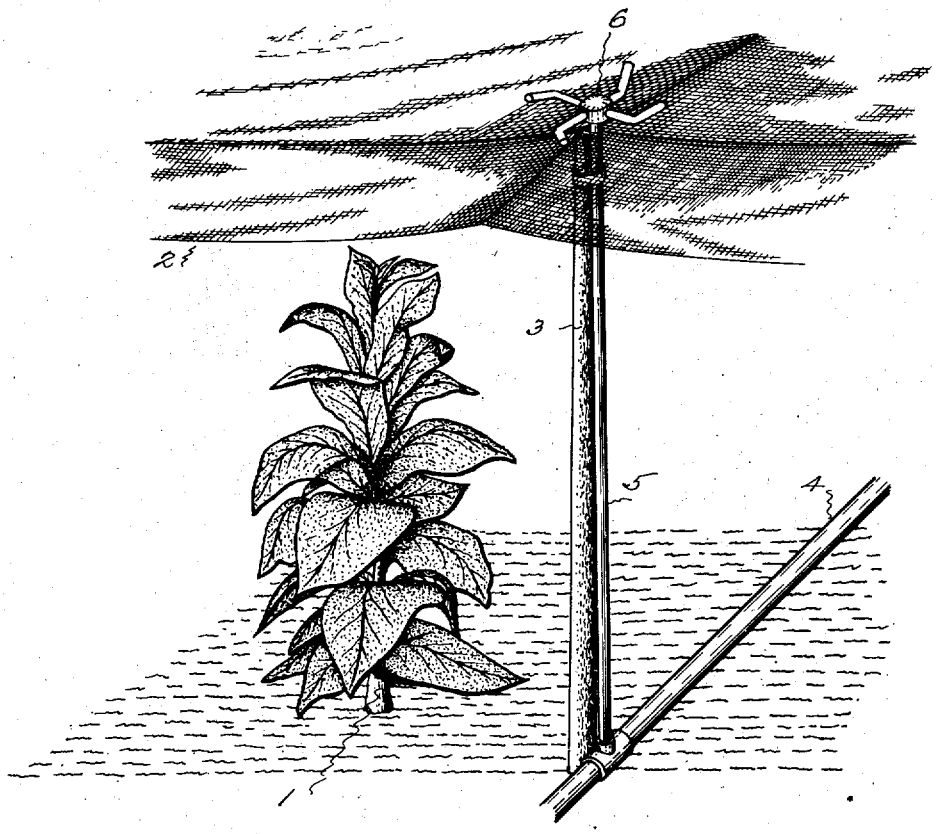
INVENTOR
Max Rosenberg by
Harry P. Williams
atty.

Reissued May 26, 1936 Re. 19,984

UNITED STATES PATENT OFFICE 19,984

METHOD OF TREATING TOBACCO

May Rosenberg, West Hartford, Conn.

Original No. 1,988,515, dated January 22, 1935, Serial No. 745,512, September 26, 1934. Application for reissue March 13, 1936, Serial No. 68,769

16 Claims. (Cl. 47—58)

This invention relates to a method of treating growing tobacco, especially shade grown, that is, tobacco which is grown under tents of open weave fabric and from the stalks of which the leaves are picked to be primarily used for cigar wrappers but may be used for other purposes. It is known that the middle leaves on the stalks of shade grown tobacco are the most valuable being lighter in color and of finer texture, and in the market on account of color and texture, they bring much higher prices than the upper leaves which are darker and coarser. For this reason it is desirable to obtain as many light and fine leaves from each plant as is possible.

The object of this invention is to so treat tobacco growing under tents that the top leaves will be lighter in color and finer in texture than they would be if nature was allowed to take its course unaided.

I have discovered that this object may be attained by artificially producing an atmospheric condition about the top leaves that is similar to that condition which causes those lower to have the qualities mentioned.

It is to be understood, of course, that my invention comprehends the treatment of tobacco growing in open fields and not protected by tents or otherwise and that the advantages of my invention are in no wise limited to any tobacco shading or protecting structure whatsoever. For the sake of full illustration, I have, however, disclosed in the drawing illustrative structure whereby the practice of my invention may be carried out in the treatment of shade grown tobacco. It is to be understood that, in the treatment of unprotected, unshaded tobacco or tobacco growing in open fields, the protective structure illustrated in the drawing will be omitted.

The soil in which this tobacco is planted is fertilized, common fertilizer containing potash, ammonia salts and other ingredients. Evaporated moisture or the gas resulting from the action of the rays of the sun on this fertilized soil has an ammonia content which affects the leaves of the growing plant, particularly those nearer the soil. Consequently the present method is designed to develop a condition about the top leaves similar to that which exists about the lower leaves, that is, to subject the top leaves to the action of gases that will produce the desirable color and texture of the lower leaves that results from the gases rising from the fertilized soil.

In practice, after the actinism of the sun has diminished, as when the sun is low or after it has set, the tent over the tobacco to be treated is sprayed with a liquid, preferably a dilute solution of ammonia, which may or may not contain vegetable coloring matter.

The accompanying drawing illustrates a contemplated means for practicing the present method.

In the view 1 indicates the growing tobacco plant and 2 the tent covering which is an open weave fabric of the nature of cheese cloth, that is supported on poles 3 in the usual manner. Piping 4 is carried over the field from a source of the fluid to be sprayed, which fluid of course is under either gravity or mechanically produced pressure. At suitable intervals upright pipes 5 may lead from the ground piping up the side of poles to points above the tenting, and their upper end provided with spraying nozzles 6, which will distribute the liquid to be used over sections of the top of the tenting.

By this means a gaseous mist which has some at least of the natural stimulating attributes of the natural gaseous condition which contributes to the development of the lower leaves, is produced about the upper leaves although of course all of the leaves are more or less affected by the mist. The tent fabric breaks up the spray so that the liquid drops become dissipated into a mist which settles upon and about the upper leaves of the tobacco so there is no spotting of the leaves. The tent fabric absorbs some of the liquid and by slow evaporation continues to give off the gas so that the desired gaseous condition about the top leaves is prolonged.

The invention claimed is:

1. The method of treating tent protected growing tobacco leaves which comprises spraying the tent above the plants and providing a stimulating gaseous mist about the top leaves.

2. The method of treating tent protected growing tobacco leaves which comprises spraying the tent above the plants with a liquid containing ammonia.

3. The method of treating growing tobacco plants which comprises covering the plant with an open mesh fabric and spraying the covering fabric with a liquid having an ammonia content.

4. The method of lightening the natural color and refining the natural texture of the top leaves of growing tobacco plants, which comprises, after the actinism of the sun has diminished, producing a gaseous mist containing ammonia about the top leaves.

5. The method of rendering the growing leaves of fertilized shade grown tobacco uniform in color and texture which consists in subjecting the leaves of the stalks to the action of a mist of liquid which has a content that is similar to a content of the fertilizer.

6. The method of treating growing tobacco leaves which comprises spraying the area above the plants and providing a stimulating gaseous mist about the leaves.

7. The method of treating growing tobacco leaves which comprises spraying the plants with a liquid containing ammonia.

8. The method of treating protected growing tobacco leaves which comprises spraying the area above the plants with a liquid containing ammonia.

9. The method of treating growing tobacco plants which comprises creating about the plants an atmosphere charged with a liquid having an ammonia content.

10. The method of treating tobacco plants which comprises, after the actinism of the sun has diminished, producing about the plants a gaseous mist containing ammonia.

11. The method of growing tobacco consisting of the steps of (*a*) fertilizing the ground in which the tobacco is growing, and (*b*) fertilizing the air in which the tobacco is growing by providing, about the leaves of the growing plant, a mist of liquid.

12. The method of growing tobacco consisting of the steps of (*a*) fertilizing the ground in which tobacco is growing, and (*b*) fertilizing the air in which tobacco is growing by providing a mist of liquid around the leaves of the plant so growing, both of said fertilizers having a similar fertilizing content.

13. The method of growing tobacco consisting of the steps of (*a*) fertilizing the ground in which the tobacco is growing, and (*b*) of providing a mist of fertilizer containing liquid about the leaves of the growing plant.

14. In a method of growing tobacco consisting of the step of fertilizing the air in which the tobacco is growing by providing about the leaves of the growing plant a mist having a fertilizing content.

15. The method of growing tobacco consisting of the step of (*a*) providing fertilizer to which the plant roots have access, and (*b*) providing fertilizer in the form of a mist to which the leaves of the growing plant have access.

16. The method of fertilizing growing tobacco plants which consists of (*a*) supplying fertilizer to the roots of the growing plant, and (*b*) supplying fertilizer to the leaves of the growing plant by means of a mist having a fertilizing content.

MAY ROSENBERG.